United States Patent
Kugel

(10) Patent No.: US 8,857,703 B2
(45) Date of Patent: Oct. 14, 2014

(54) MAPPING AN IMAGE TO AN OBJECT USING A MATRIX CODE

(75) Inventor: Jacob Kugel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 13/397,146

(22) Filed: Feb. 15, 2012

(65) Prior Publication Data

US 2013/0206830 A1   Aug. 15, 2013

(51) Int. Cl.
*G06K 7/00* (2006.01)

(52) U.S. Cl.
USPC ........................... 235/375; 235/462.01

(58) Field of Classification Search
USPC ..................... 343/700 MS; 235/462
See application file for complete search history.

(56) References Cited

U.S. PATENT DOCUMENTS

| | | | |
|---|---|---|---|
| 7,885,955 B2 | 2/2011 | Hull et al. | |
| 2007/0047780 A1* | 3/2007 | Hull et al. | 382/124 |
| 2007/0063050 A1* | 3/2007 | Attia et al. | 235/462.46 |
| 2011/0149336 A1 | 6/2011 | Price | |
| 2013/0037605 A1* | 2/2013 | Cok et al. | 235/375 |

OTHER PUBLICATIONS

"Augmented Reality Advertising", pp. 1-12, retrieved Jan. 14, 2014, <https://blippar.com/en>.
U.S. Appl. No. 13/770,241, filed Feb. 19, 2013, titled, "Mapping an Image to an Object Using a Matrix Code".

* cited by examiner

*Primary Examiner* — Matthew Mikels
(74) *Attorney, Agent, or Firm* — Patterson & Sheridan LLP

(57) ABSTRACT

Embodiments of the invention may provide an approach for mapping an image to an object using a matrix code. An associated method generally may include decoding a matrix code on a surface of the object to determine a network location of the image; downloading the image from the network location; retrieving a plurality of coordinate sets referenced by the matrix code; mapping the image to at least one region of the object according to the plurality of coordinate sets; and displaying the object with the mapped image. In one embodiment, the step of mapping the image to at least one region of the object according to the plurality of coordinate sets includes mapping a plurality of portions of the image to respective regions of the object according to respective pluralities of coordinate sets.

15 Claims, 7 Drawing Sheets

MAPPING AN IMAGE TO AN OBJECT USING A MATRIX CODE

BACKGROUND

Embodiments of the invention are directed to techniques for mapping an image to an object using a matrix code. More specifically, embodiments of the invention provide methods for using a matrix code to augment or replace a region of a scanned page or a surface region of a photographed three-dimensional object with an image.

A matrix code, such as a Quick Response code or QR code, is a form of barcode comprising black modules. The black modules are generally rectangular and may be arranged in a square pattern on a white background. Conventionally, a matrix code contains encoded information about the object in which the matrix code is embedded. A scanner, a smartphone, or another electronic device may be equipped to read and process the encoded black modules of a matrix code. Compared to a conventional linear barcode, a matrix code has relatively high storage capacity. A matrix code may be encrypted for security purposes.

A matrix code may encode various forms of data, including binary bits, alphanumeric characters, vCard files, and URLs. A matrix code may provide information regarding one or more regions of the object in which it is embedded. Furthermore, a matrix code may encode information for one or more applications of the object. Example applications for matrix codes include price checking, part tracking, transport ticketing, and marketing. For instance, a matrix code may provide pricing information for a product to be sold commercially, or a matrix code may provide information regarding the publisher and author of a reference manual.

SUMMARY

Embodiments of the invention may be used to augment or replace a region of a scanned page or a surface region of a photographed three-dimensional object. One embodiment of the invention includes a method of mapping an image to an object. The method generally may include decoding a matrix code on a surface of the object to determine a network location of the image; downloading the image from the network location; retrieving a plurality of coordinate sets referenced by the matrix code; mapping the image to at least one region of the object according to the plurality of coordinate sets; and displaying the object with the mapped image.

In a one embodiment, the object may be a scanned page, and the plurality of coordinate sets may include two-dimensional coordinate pairs describing a position on the scanned page. In another embodiment, the object may be depicted in a captured photograph, and the plurality of coordinate sets may include three-dimensional coordinate sets describing a position on a surface of the object.

In a particular embodiment, the step of mapping the image to at least one region of the object according to the plurality of coordinate sets may include mapping a plurality of portions of the image to respective regions of the object according to respective pluralities of coordinate sets. In one embodiment, the mapped image may augment the at least one region of the object. In another embodiment, the mapped image may replace the at least one region of the object.

In one embodiment, the plurality of coordinate sets may designate a position for the image on the surface of the object relative to a position of the matrix code. In another embodiment, the plurality of coordinate sets may designate an absolute position for the image on the surface of the object.

Additional embodiments include a computer-readable storage medium storing an application, which, when executed on a processor, performs the above recited method as well as a system having a processor and a memory storing a program, which, when executed on the processor, performs the above recited method.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
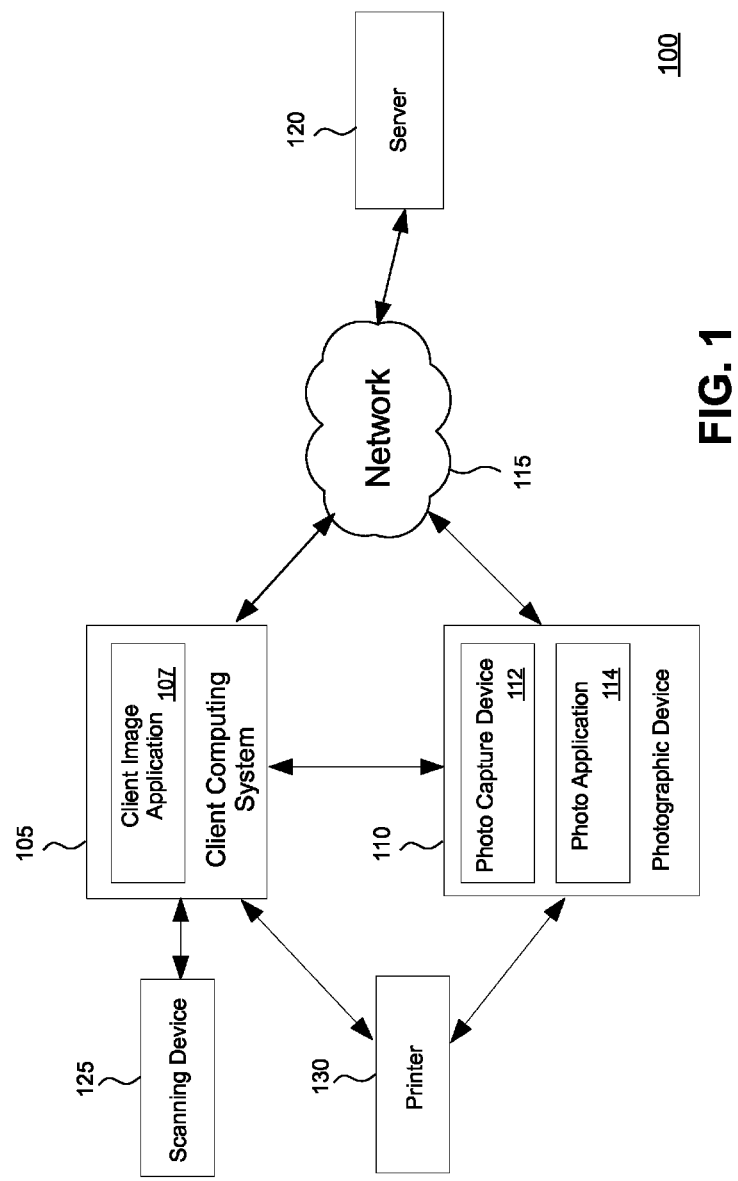
FIG. 1 illustrates a computing infrastructure used to map an image to an object using a matrix code, according to one embodiment of the invention.

Embodiments of the invention provide techniques for using a matrix code to augment or replace a portion of a page or photographed object. In one embodiment, a scanning device may scan a page containing an embedded matrix code. The computer may receive the scanned page and may decode the matrix code. The matrix code may include a URL or an internal server path indicating a network location (e.g., a remote server). The computer may retrieve an image stored at the network location via the URL or internal server path. The image may include any form of digital content, including text only, graphics only, or both text and graphics. The computer may download the image from the network location. Additionally, the computer may retrieve a plurality of two-dimensional coordinate sets (i.e., coordinate pairs) from either the matrix code itself or from a text file located locally or at a remote server. In one embodiment, the matrix code may provide a second URL or internal server path indicating the location of a text file including the coordinate pairs. The coordinate pairs may determine where the image should be placed on the scanned page. The coordinate pairs may designate an absolute position for the image on the scanned page, or alternatively the coordinate pairs may designate a position for the image relative to the matrix code. The computer may map the image onto the scanned page according to the coordinate pairs. Subsequently, the computer may display or print the scanned page with the mapped image superimposed onto a portion of the scanned page. The superimposed image may either augment or replace a region of the scanned page.

In another embodiment, a photographic device (e.g., smartphone or heads-up display eyewear) may capture a digital photograph depicting a three-dimensional object having a matrix code on one of its surfaces. The photographic device may decode the matrix code from the photograph to determine a network location (e.g., a remote server). In an alternative embodiment, the photographic device may send the photograph to a computer, and the computer may decode the matrix code and return the network location to the photographic device. The matrix code may include a URL or an internal server path indicating the network location. The photographic device may retrieve an image stored at the network location via the URL or internal server path. The image may include any form of digital content, including text only, graphics only, or both text and graphics. The photographic device may download the image from the network location. Additionally, the photographic device may retrieve a plurality of three-dimensional coordinate sets from either the matrix code itself or from a text file located locally or at a remote server. In one embodiment, the matrix code may provide a second URL or internal server path indicating the location of a text file including the three-dimensional coordinate sets. The three-dimensional coordinate sets may determine where the image should be placed on the surface of the three-dimensional object. The three-dimensional coordinate sets may designate an absolute position for the image, or alternatively the three-dimensional coordinate sets may designate a position for the image relative to the matrix code. The photographic device may map the image onto the three-dimensional object. Subsequently, the photographic device may display or print the three-dimensional object with the downloaded image superimposed on a portion of the object. The superimposed image may either augment or replace a surface region of the three-dimensional object.

Embodiments of the invention may have various applications. For instance, a device may use coordinate sets provided by matrix codes located on the surface of manufactured parts to superimpose instructions on the surface of such parts. Moreover, a device may use coordinate pairs provided by a matrix code on a scanned page to superimpose native language text upon one or more regions of the page with foreign language text, thus making the page accessible to a global audience. Furthermore, a device may use coordinate pairs provided by a matrix code on a scanned page to highlight or modify the characteristics of text in one or more regions of the page, thus making the page more aesthetically pleasing or readable.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium or, alternatively, a computer readable signal medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a scanned image or photographed three-dimensional object may be deployed to a computing cloud (whether the cloud itself is provided by the enterprise or a third party). For example, a computer, smartphone, or photographic device processing a scanned image or a photographed three-dimensional object may manage cloud-based database systems, virtual machines, and a variety of other server applications.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, particular embodiments of the invention describe techniques for using a matrix code to map an image to an object for the purpose of enhancing one or more regions of the object. However, it should be understood that the techniques described herein may be adapted to a variety of purposes in addition to the uses for augmenting or replacing a region of a scanned page or a surface region of a photographed three-dimensional object. Accordingly, references to the specific embodiments are included to be illustrative and not limiting.

FIG. 1 illustrates a computing infrastructure 100 used to map an image to an object using a matrix code, according to one embodiment of the invention. As shown, the computing infrastructure 100 may include a client computing system 105, a photographic device 110, and a server 120, each connected to a communications network 115. The client computing system 105 may communicate with the photographic device 110 and a scanning device 125. Both the client computing system 105 and the photographic device 110 may communicate with a printer 130.

Illustratively, the client computing system 105 includes a client image application 107 used to process a page scanned by the scanning device 125. The client application 107 may communicate with the server 120 to download an image to be mapped to the scanned page. In one embodiment, the client application 107 further may retrieve a pair of coordinates indicated by a matrix code located on the scanned page. In one embodiment, the client computing system 105 may be a thin client with limited processing capabilities. Although shown as a single client computing system, the client computing system 105 is included to be representative of a single client or multiple clients.

Illustratively, the photographic device 110 includes a photo capture device 112 and a photo application 114. In one embodiment, the photo capture device 112 may capture a photograph of a three-dimensional object. The photo application 114 may process a photograph captured by the photo capture device 112. The photo application 114 may communicate with the server 120 to download an image to be mapped to a surface of a three-dimensional object photographed by the photo capture device 112. In one embodiment, the photo application 114 further may retrieve three-dimensional coordinates indicated by a matrix code located on a surface of a photographed three-dimensional object. In one embodiment, the photographic device 110 may be a smartphone. In another embodiment, the photographic device 110 may be a headmounted photo capture and display device configured to capture and display images within the field of vision of a user (e.g., heads-up display eyewear). In a further embodiment, the photographic device 110 may be a digital camera. In one embodiment, during the process of mapping an image to a surface of a photographed three-dimensional object, the photographic device 110 may send the three-dimensional coordinates to the client computing system 105 for processing.

Figure 2:
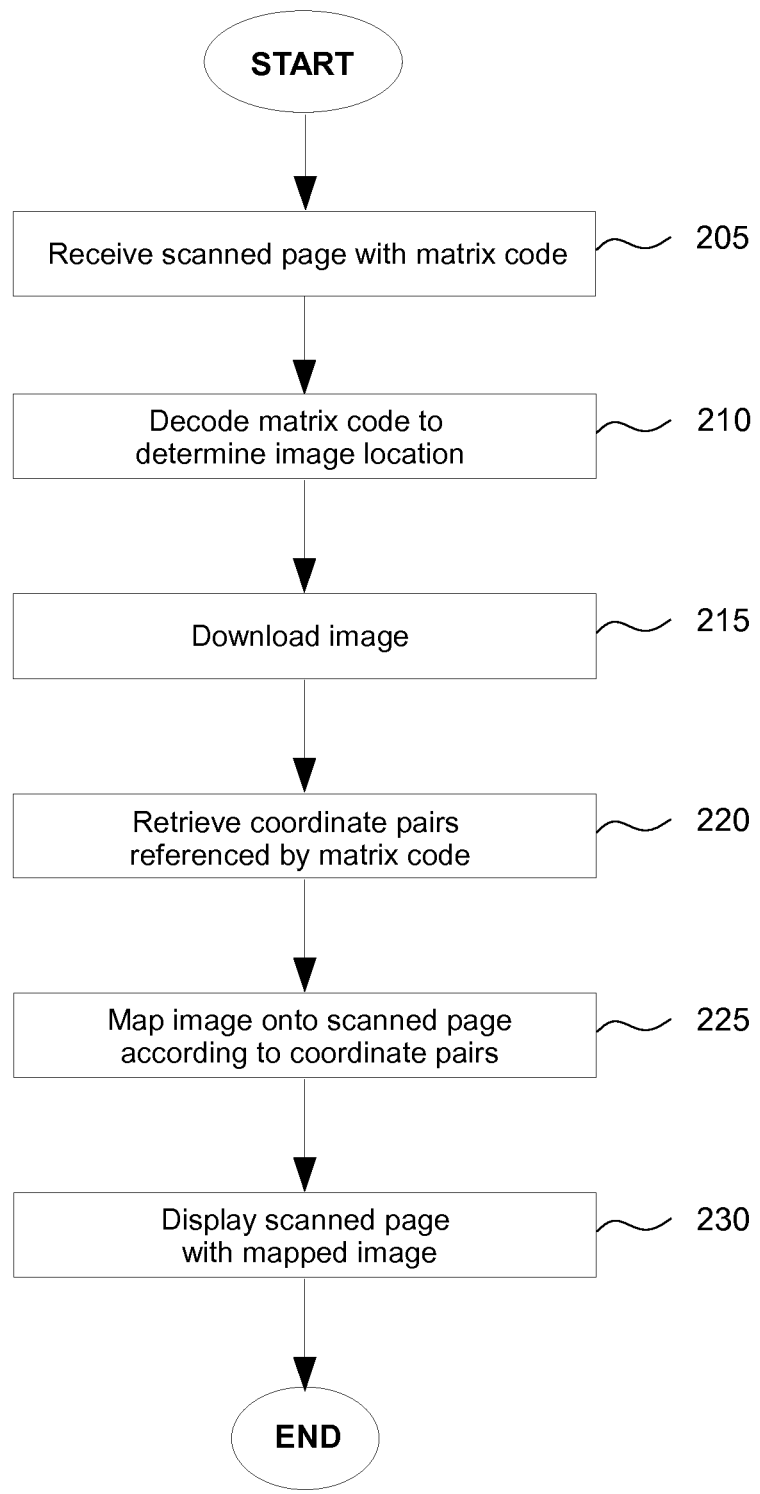
FIG. 2 illustrates a method of augmenting or replacing a region of a scanned page using a matrix code, according to one embodiment of the invention.

FIG. 2 illustrates a method 200 of augmenting or replacing a region of a scanned page using a matrix code, according to one embodiment of the invention. As shown, the method 200 begins at step 205, where a client computing system receives a scanned page including a matrix code. The client may receive the scanned page from a scanning device or another device (e.g., a smartphone). The matrix code may include an encoded network location of an image and further may reference a plurality of two-dimensional coordinate sets (i.e., coordinate pairs).

At step 210, a client application of the client computing system decodes the matrix code to determine a network location of an image. The network location may be represented by a URL or an internal server path. At step 215, the client computing system downloads the image from the network location. The client may download the image from a remote or local server by consulting the URL or internal server path decoded from the matrix code. The image may include graphics only, text only, or both graphics and text.

At step 220, the client computing system retrieves the two-dimensional coordinate pairs referenced by the matrix code. The client may retrieve the coordinate pairs from the decoded matrix code information, or alternatively the client may retrieve the coordinate pairs from another location (e.g., a local or remote server). In one embodiment, the matrix code may provide a second URL or internal server path indicating the location of a text file including the coordinate pairs. In one embodiment, the coordinate pairs may designate a position for the image on the scanned page relative to the position of the matrix code. In another embodiment, the coordinate pairs may designate an absolute position for the image on the scanned page. The coordinate pairs may designate that the entire image or a portion of the image be superimposed onto a region of the scanned page.

At step 225, the client computing system maps the image onto a region of the scanned page according to the coordinate pairs. Specifically, the client application may perform the mapping. Using the client application, the client computing system may superimpose the entire image or portions of the entire image onto a region of the scanned page according to the coordinate pairs. At step 230, the client computing system may display or print the scanned page with the mapped image. In one embodiment, the mapped image may augment the region of the scanned page on which it is mapped. In another embodiment, the mapped image may replace the region of the scanned page on which it is mapped.

Figure 3:
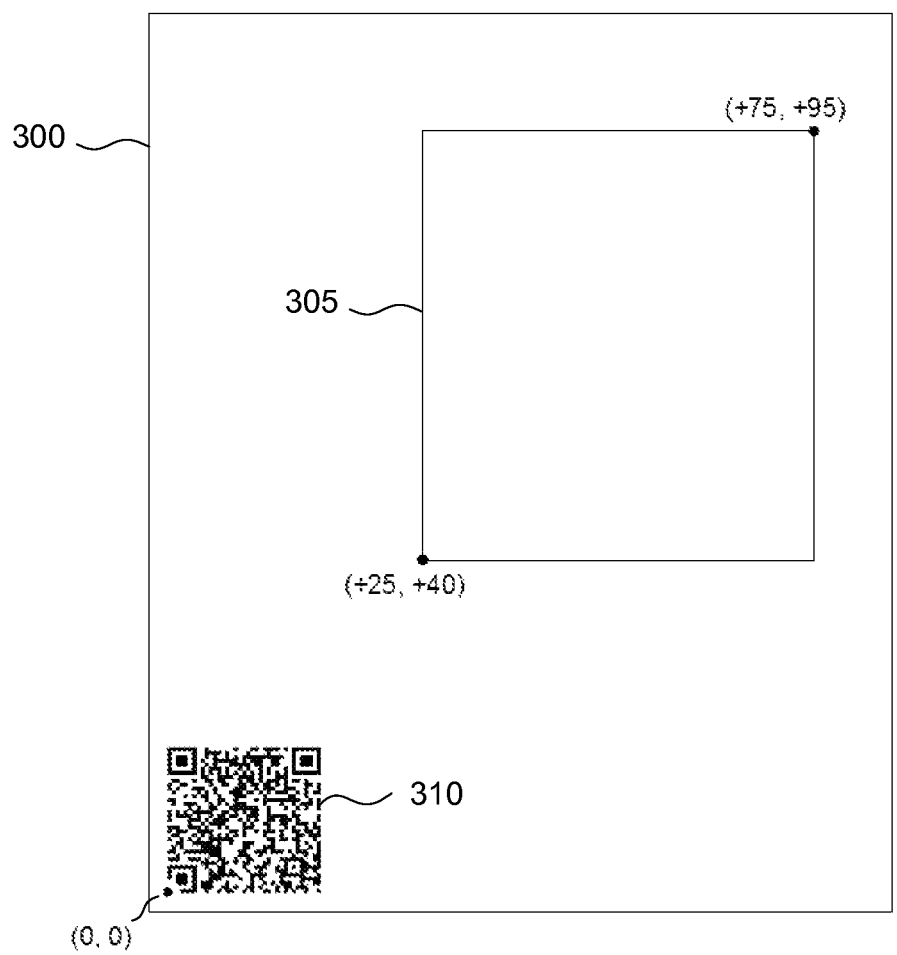
FIG. 3 illustrates an example image mapped onto a scanned page by a client computing system according to coordinate pairs designating a relative position for the image, according to one embodiment of the invention.

FIG. 3 illustrates an example image 305 mapped onto a scanned page 300 by the client computing system 105, according to the steps of the method 200. In this example, the client computing system 105 maps the image 305 onto the scanned page 300 according to coordinate pairs referenced by a matrix code 310. The coordinate pairs designate a position for the image 305 relative to a position of the matrix code 310. As shown, the position of the bottom left corner of the matrix code 310 is defined as position (0, 0). The client computing system 105 maps the image 305 such that the bottom left corner of the image 305 is located at position (+25, +40) of the scanned page 300 relative to the defined (0, 0) position. In this context, "+25" indicates that the X-position of the image 305 is 25 units further along the X-axis than the X-position of the defined (0, 0) position, and "+40" indicates that the Y-position of the image 305 is 40 units further along the Y-axis than the Y-position of the defined (0, 0) position. Moreover, the client computing system 105 superimposes the image 305 such that the top right corner of the image 305 is located at position (+75, +95) of the scanned page 300 relative to the defined (0, 0) position.

Figure 4:
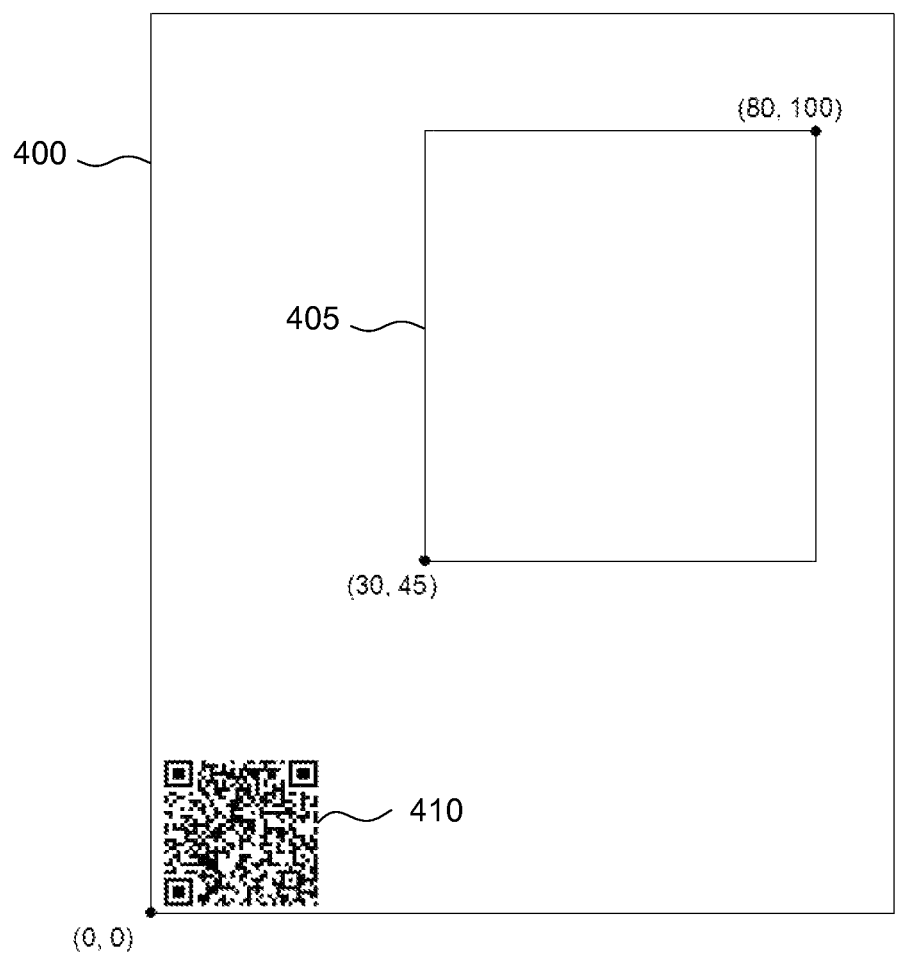
FIG. 4 illustrates an example image mapped onto a scanned page by a client computing system according to coordinate pairs designating an absolute position for the image, according to one embodiment of the invention.

FIG. 4 illustrates an example image 405 mapped onto a scanned page 400 by the client computing system 105, according to the steps of the method 200. In this example, the client computing system 105 maps the image 405 onto the scanned page 400 according to coordinate pairs referenced by the matrix code 410. The coordinate pairs designate an absolute position for the image 405. As shown, a matrix code 410 is located near the bottom left corner of the scanned page 400. The position of the bottom left corner of the scanned page 400 is indicated by two-dimensional coordinates (0, 0). The client computing system 105 maps the image 405 onto the scanned page 400 such that the bottom left corner of the image is located at position (30, 45) of the scanned page 400 and the top right corner of the image is located at position (80, 100) of the scanned page 400.

According to the method 200, the client computing system 105 may map an entire image or a portion of an image to a region of a scanned page according to coordinate pairs referenced by a matrix code. In a further embodiment, the client computing system 105 may map a plurality of portions of an image to respective regions of a scanned page according to respective pluralities of coordinate pairs referenced by a matrix code. In this embodiment, the client computing system 105 may augment or replace multiple regions of the scanned page with respective portions of the image.

In a further embodiment, a scanned page may have multiple matrix codes, each representing a respective region of the scanned page. In this embodiment, the client computing system 105 may map a plurality of portions of an image to respective regions of the scanned page according to respective pluralities of coordinate pairs referenced by the respective matrix codes. The client computing system 105 in this embodiment may augment or replace each of multiple regions of the scanned page with a respective portion of the image according to the coordinate pairs referenced by the respective matrix code representing the region.

In further embodiments, a plurality of separate images may be mapped to a scanned page. In one embodiment, the client computing system 105 may map a plurality of separate images to respective regions of a scanned page according to respective pluralities of coordinate pairs referenced by a single matrix code. In another embodiment, the client computing system 105 may map a plurality of separate images to respective regions of a scanned page according to respective pluralities of coordinate pairs referenced by a plurality of respective matrix codes.

Figure 5:
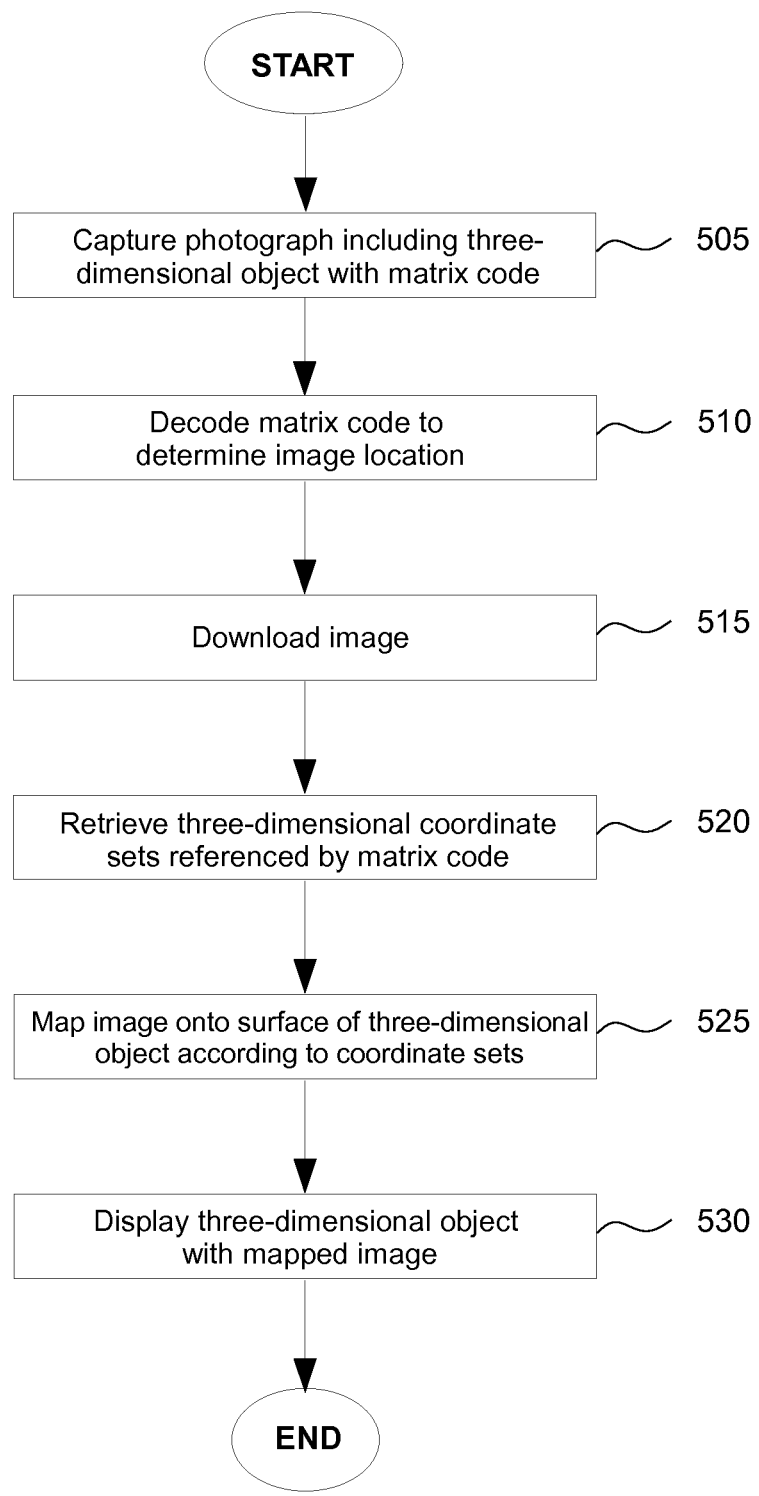
FIG. 5 illustrates a method of augmenting or replacing a surface region of a photographed three-dimensional object using a matrix code, according to one embodiment of the invention.

FIG. 5 illustrates a method 500 of augmenting or replacing a surface region of a photographed three-dimensional object using a matrix code, according to one embodiment of the invention. As shown, the method 500 begins at step 505, where a photographic device (e.g., smartphone or heads-up display eyewear) captures a photograph depicting a three-dimensional object having a matrix code. The matrix code may be located on a surface of the three-dimensional object. The matrix code may include an encoded network location of an image and further may reference three-dimensional coordinate sets.

At step 510, a photo application of the photographic device decodes the matrix code to determine a network location of an image. The network location may be represented by a URL or an internal server path. Since the matrix code is located on a surface of a three-dimensional object, the photo application may use conventional techniques to establish a three-dimensional coordinate system with respect to the object such that the photo application may properly read and decode the matrix code. In an alternative embodiment, the photographic device may send the photograph to a computing system, and the computing system may decode the matrix code and return the network location to the photographic device. At step 515, the photographic device downloads the image from the network location. The photographic device may download the image from a remote or local server by consulting the URL or internal server path decoded from the matrix code. The image may include graphics only, text only, or both graphics and text.

At step 520, the photographic device retrieves the three-dimensional coordinate sets referenced by the matrix code. The photographic device may retrieve the three-dimensional coordinate sets from the decoded matrix code information, or alternatively the device may retrieve the three-dimensional coordinate sets from another location (e.g., a local or remote server). In one embodiment, the matrix code may provide a second URL or internal server path indicating the location of a text file including the three-dimensional coordinate sets. In one embodiment, the three-dimensional coordinate sets may designate a position for the image on a surface of the photographed three-dimensional object relative to the position of the matrix code. In another embodiment, the three-dimensional coordinate sets may designate an absolute position for the image on a surface of the photographed three-dimensional object. In one embodiment, the three-dimensional coordinate sets may designate that the entire image or a portion of the image be superimposed onto a surface region of the photographed three-dimensional object.

At step 525, the photographic device maps the image onto a surface region of the photographed three-dimensional object according to the three-dimensional coordinate sets. Specifically, the photo application may perform the mapping. Using the photo application, the photographic device may superimpose the entire image or portions of the entire image onto a surface region of the three-dimensional object according to the three-dimensional coordinate sets. At step 530, the photographic device may display or print the photographed three-dimensional object with the mapped image. In one embodiment, the mapped image may augment the surface region of the three-dimensional object on which it is mapped. In another embodiment, the mapped image may replace the surface region of the three-dimensional object on which it is mapped.

Figure 6:
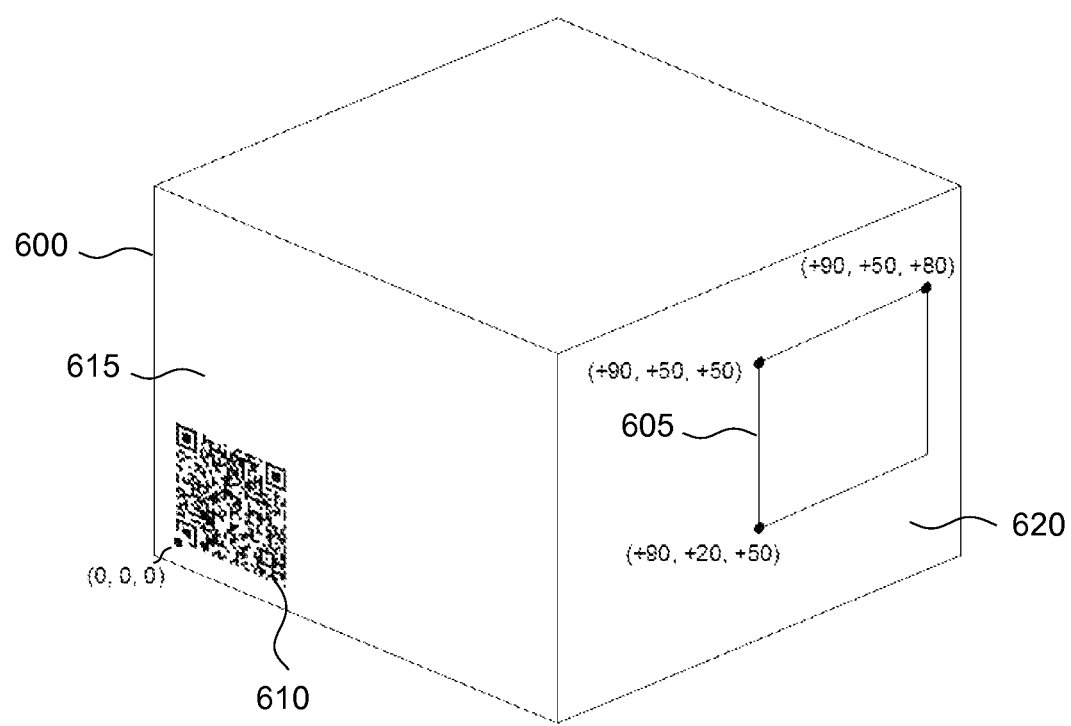
FIG. 6 illustrates an example image mapped onto a surface of a photographed three-dimensional object by a photographic device according to coordinate sets designating a relative position for the image, according to one embodiment of the invention.

FIG. 6 illustrates an example image 605 mapped onto a three-dimensional object 600 by the photographic device 110, according to the steps of the method 500. In this example, the photographic device 110 maps the image 605 according to coordinate sets referenced by a matrix code 610 on surface 615. The coordinate sets designate a position for the image 605 relative to a position of the matrix code 610. As shown, the position of the bottom left corner of the matrix code 610 on surface 615 of the three-dimensional object 600 is defined as position (0, 0, 0). The photographic device 110 maps the image 605 onto surface 620 of the three-dimensional object such that the bottom left corner of the image is located at position (+90, +20, +50) of the three-dimensional object 600 relative to the defined (0, 0, 0) position. In this context, "+90" indicates that the X-position of the image 605 is 90 units further along the X-axis than the X-position of the defined (0, 0, 0) position, "+20" indicates that the Y-position of the image 605 is 20 units further along the Y-axis than the Y-position of the defined (0, 0, 0) position, and "+50" indicates that the Z-position of the image 605 is 50 units further along the Z-axis than the Z-position of the defined (0, 0, 0) position. The top right corner of the image 605 is located at position (+90, +50, +80) of the three-dimensional object 600 relative to the defined (0, 0, 0) position. The top left corner of the image 605 is located at position (+90, +50, +50) of the three-dimensional object 600 relative to the defined (0, 0, 0) position.

Figure 7:
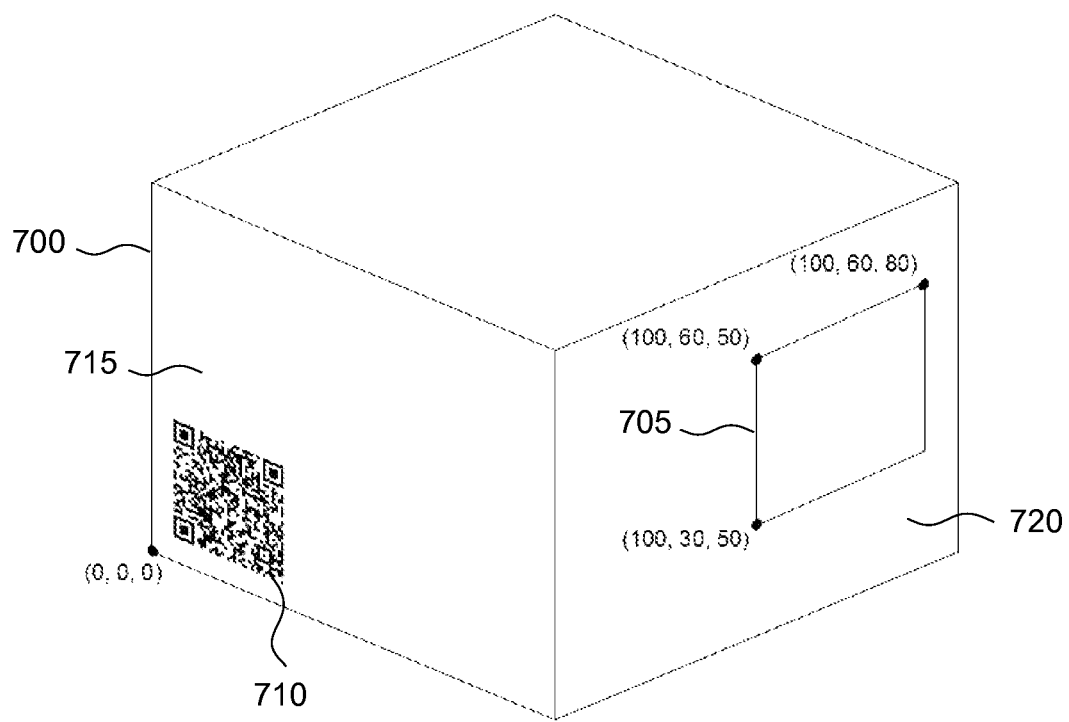
FIG. 7 illustrates an example image mapped onto a surface of a photographed three-dimensional object by a photographic device according to coordinate sets designating an absolute position for the image, according to one embodiment of the invention.

FIG. 7 illustrates an example image 705 mapped onto a surface of a photographed three-dimensional object 700 by the photographic device 110, according to the steps of the method 500. In this example, the photographic device 110 maps the image 705 according to coordinate sets referenced by a matrix code 710 on surface 715. The coordinate sets designate an absolute position for the image 705. As shown, the matrix code 710 is located near the bottom left corner of a surface 715 of the three-dimensional object 700. The position of the bottom left corner of the surface 715 of the three-dimensional object 700 is indicated by three-dimensional coordinates (0, 0, 0). The photographic device 110 maps the image 705 onto surface 720 of the three-dimensional object 700 such that the bottom left corner of the image 705 is located at position (100, 30, 50), the top right corner of the image 705 is located at position (100, 60, 80), and the top left corner of the image 705 is located at position (100, 60, 50).

According to the method 500, the photographic device 110 may map an entire image or a portion of an image to a surface region of a three-dimensional object according to three-dimensional coordinate sets referenced by a matrix code. In a further embodiment, the photographic device 110 may map a plurality of portions of an image to respective surface regions of a photographed three-dimensional object according to respective pluralities of three-dimensional coordinate sets referenced by a matrix code. In this embodiment, the client computing system 105 may augment or replace multiple surface regions of the three-dimensional object with respective portions of the image.

In a further embodiment, a photographed three-dimensional object may have multiple matrix codes, each representing a respective surface region of the three-dimensional object. In this embodiment, the photographic device 110 may map a plurality of portions of an image to respective surface regions of the three-dimensional object according to respective pluralities of three-dimensional coordinate sets referenced by the respective matrix codes. The photographic device 110 in this embodiment may augment or replace each of multiple surface regions of the three-dimensional object with a respective portion of the image according to the three-dimensional coordinate sets referenced by the respective matrix code representing the surface region.

In further embodiments, a plurality of separate images may be mapped to a photographed three-dimensional object. In one embodiment, the photographic device 110 may map a plurality of separate images to respective surface regions of a photographed three-dimensional object according to respective pluralities of three-dimensional coordinate sets referenced by a single matrix code. In another embodiment, the photographic device 110 may map a plurality of separate images to respective surface regions of a photographed three-dimensional object according to respective pluralities of three-dimensional coordinate sets referenced by a plurality of respective matrix codes.

According the embodiments of the invention, a computer or photographic device may use coordinate sets referenced by a matrix code to map an image to an object. Such mapping may permit a device to augment or replace a region of a scanned page or a surface region of a photographed object. Accordingly, the embodiments provide an efficient and inexpensive solution for enhancing a scanned page or photographed object for various purposes.

While the foregoing is directed to embodiments of the present invention, other and further embodiments of the invention may be devised without departing from the basic scope thereof, and the scope thereof is determined by the claims that follow.

What is claimed is:

1. A computer-readable storage medium storing an application, which, when executed on a processor, performs an operation of mapping an image to an object, the operation comprising:
    decoding a matrix code on a surface of the object to determine a first network location of the image, wherein the first network location is encoded in the matrix code;
    downloading the image from the first network location;
    retrieving a plurality of coordinate sets specified in the decoded matrix code;
    mapping the image to at least one region of the object at a position specified by the plurality of coordinate sets; and
    displaying the object with the mapped image.

2. The computer-readable storage medium of claim 1, wherein the object is a scanned page, and wherein the plurality of coordinate sets include two-dimensional coordinate pairs describing the position on the scanned page.

3. The computer-readable storage medium of claim 1, wherein the object is depicted in a captured photograph, and wherein the plurality of coordinate sets include three-dimensional coordinate sets describing the position on a surface of the object.

4. The computer-readable storage medium of claim 1, wherein mapping the image to at least one region of the object at the position specified by plurality of coordinate sets comprises mapping a plurality of portions of the image to respective regions of the object at positions specified by respective pluralities of coordinate sets.

5. The computer-readable storage medium of claim 1, wherein the mapped image augments the at least one region of the object.

6. The computer-readable storage medium of claim 1, wherein the mapped image replaces the at least one region of the object.

7. The computer-readable storage medium of claim 1, wherein the plurality of coordinate sets designate a position for the image on the surface of the object relative to a position of the matrix code.

8. The computer-readable storage medium of claim 1, wherein the plurality of coordinate sets designate an absolute position for the image on the surface of the object.

9. A system comprising:
    a processor; and
    a memory storing a program, which, when executed on the processor, performs an operation of mapping an image to an object, the operation comprising:
        decoding a matrix code on a surface of the object to determine a first network location of the image, wherein the first network location is encoded in the matrix code;
        downloading the image from the first network location;
        retrieving a plurality of coordinate sets specified in the decoded matrix code;
        mapping the image to at least one region of the object at a position specified by the plurality of coordinate sets; and
        displaying the object with the mapped image.

10. The system of claim 9, wherein the object is a scanned page, and wherein the plurality of coordinate sets include two-dimensional coordinate pairs describing the position on the scanned page.

11. The system of claim 9, wherein the object is depicted in a captured photograph, and wherein the plurality of coordinate sets include three-dimensional coordinate sets describing the position on a surface of the object.

12. The system of claim 9, wherein mapping the image to at least one region of the object at the position specified by the plurality of coordinate sets comprises mapping a plurality of portions of the image to respective regions of the object at positions specified by respective pluralities of coordinate sets.

13. A computer-readable storage medium storing an application, which, when executed on a processor, performs an operation of mapping an image to an object, the operation comprising:
    decoding a matrix code on a surface of the object to determine a first network location of the image;
    downloading the image from the first network location;
    retrieving, from a file located at a second network location, a plurality of coordinate sets, wherein the second network location is encoded in the matrix code;
    mapping the image to a region of the object at a position specified by the plurality of coordinate sets; and
    displaying the object with the mapped image.

14. The computer-readable storage medium of claim 13, wherein the object is a scanned page, and wherein the plurality of coordinate sets include two-dimensional coordinate pairs describing a position on the scanned page.

15. The computer-readable storage medium of claim 13, wherein the plurality of coordinate sets include three-dimensional coordinate sets describing a position on a surface of the object.

* * * * *